(12) United States Patent
Gardner et al.

(10) Patent No.: US 12,708,970 B2
(45) Date of Patent: Aug. 18, 2026

(54) HIGH PRECISION TEMPERATURE AND CONTAMINANT CONTROL FOR PRECISE MACHINE TOOL POSITIONING

(71) Applicant: Coventry Associates, Inc., West Boylston, MA (US)

(72) Inventors: Craig Martin Gardner, West Boylston, MA (US); David Blodgett, Northbridge, MA (US)

(73) Assignee: Coventry Associates, Inc., West Boylston, MA (US)

(*) Notice: Subject to any disclaimer, the term of this patent is extended or adjusted under 35 U.S.C. 154(b) by 685 days.

(21) Appl. No.: 17/998,468

(22) PCT Filed: May 21, 2021

(86) PCT No.: PCT/US2021/033655
§ 371 (c)(1),
(2) Date: Nov. 10, 2022

(87) PCT Pub. No.: WO2021/237089
PCT Pub. Date: Nov. 25, 2021

(65) Prior Publication Data

US 2023/0201984 A1 Jun. 29, 2023

Related U.S. Application Data

(60) Provisional application No. 63/028,470, filed on May 21, 2020.

(51) Int. Cl.
*B23Q 11/00* (2006.01)
*B23Q 1/54* (2006.01)

(52) U.S. Cl.
CPC .......... *B23Q 11/005* (2013.01); *B23Q 1/5468* (2013.01)

(58) Field of Classification Search
CPC ......... B24B 55/06; B24B 41/02; B24B 41/04; B24B 41/06; B24B 41/00; B24B 47/12;
(Continued)

(56) References Cited

U.S. PATENT DOCUMENTS 5,738,564 A * 4/1998 Helle .................... B23Q 1/012 451/48
7,803,034 B2 9/2010 Camp et al.
(Continued)

FOREIGN PATENT DOCUMENTS

CN 214383053 U 10/2021
DE 19734628 A1 * 2/1999 ............ B08B 15/04
(Continued)

OTHER PUBLICATIONS

Machine translation of DE-19734628-A1 (Year: 1999).*
(Continued)

*Primary Examiner* — Robert F Neibaur
(74) *Attorney, Agent, or Firm* — Smith Baluch LLP

(57) ABSTRACT

A contaminant control system for reducing or substantially preventing the ingress of contaminants into a positioning system to prevent degradation in precision and accuracy of the positioning system. The contaminant control system directs a gas flow through the interior of the positioning system and creates an internal pressure within the positioning system that is greater than the ambient air pressure. The contaminant control system may include a temperature conditioner to heat and/or cool the gas flowing through the positioning system. Temperature conditioning may provide additional positioning system precision and accuracy by mitigating thermal effects. The contaminant control system includes a controller to control both the gas flow and gas temperature.

18 Claims, 10 Drawing Sheets

(58) Field of Classification Search
CPC ....... B24B 27/006; B24B 49/14; B24B 49/16; B24B 55/04; B24B 55/045; B24B 19/06; B08B 5/02; B23Q 11/005; B23Q 16/10; B23Q 1/26; B23Q 1/012; B23Q 1/01; B23Q 2220/02; B23P 29/326
USPC ................ 451/5, 11, 135, 211, 28, 268, 262
See application file for complete search history.

(56) References Cited

U.S. PATENT DOCUMENTS

| | | | |
|---|---|---|---|
| 2004/0176017 | A1 | 9/2004 | Zelenski et al. |
| 2006/0135043 | A1 | 6/2006 | Wakazono |
| 2007/0232196 | A1 | 10/2007 | Camp et al. |
| 2010/0252236 | A1 | 10/2010 | Schneider et al. |
| 2019/0070699 | A1 | 3/2019 | Itou |

FOREIGN PATENT DOCUMENTS

| | | | | |
|---|---|---|---|---|
| DE | 29522019 | U1 | 4/1999 | |
| EP | 3597335 | A1 | 1/2020 | |
| JP | 2006144938 | A | 6/2006 | |
| JP | 2015180832 | A | 10/2015 | |
| JP | 2017205860 | A | 11/2017 | |
| JP | 2020069605 | A | 5/2020 | |
| KR | 20050070739 | A1 | 7/2005 | |
| WO | WO-2019098915 | A1 * | 5/2019 | ........... B23Q 11/127 |

OTHER PUBLICATIONS

Japanese Office Action with translation in Japanese App. No. 2022-571142 dated Mar. 3, 2025, 12 pages.

EPS MultiTool. Coventry Associates. Accessed at https://www.coventryassociates.com/eps-multi-tool/ on Jun. 2, 2021. 4 pages.

International Search Report and Written Opinion in International Patent Application No. PCT/US2021/033655 mailed Aug. 24, 2021, 12 pages.

Extended European Search Report in European App. No.21808334.3 dated Apr. 30, 2024, 9 pages.

Korean Office Action with translation in Korean App. No. 10-2022-7043731 dated Feb. 3, 2026, 17 pages.

* cited by examiner

HIGH PRECISION TEMPERATURE AND CONTAMINANT CONTROL FOR PRECISE MACHINE TOOL POSITIONING

CROSS-REFERENCE TO RELATED APPLICATION(S)

This application is a national-stage application, under 35 U.S.C. 371, of International Application No. PCT/US2021/033655, filed on May 21, 2021, which in turn claims the priority benefit, under 35 U.S.C. 119(e), of U.S. Application No. 63/028,470, filed on May 21, 2020. Each of these applications is incorporated herein by reference in its entirety for all purposes.

BACKGROUND

There are innumerable situations in which it is necessary to position an object automatically and properly in two or three dimensions. This need is common in the industrial world, in which machines are used to move objects in a reliable, repeatable manner. One example is the grinding of bearing races. Millions of bearing races are ground each year, using very carefully controlled grinding machines. Such machines need to move the grinding tool into and out of the grinding location (termed the "Z" direction), and toward and away from the bearing race (termed the "X" direction). They must also control the angular position of the grinding wheel relative to the race. Consequently, there are several positioning systems configured to accomplish two or three-axis motion of an object that can be coupled to the grinding machines.

U.S. Pat. No. 7,803,034, which is incorporated herein by reference, discloses an eccentric positioning system (EPS) that can be used to move and position an object very precisely (e.g., within about 0.05 microns of a desired position) and very quickly (e.g., within 10 seconds) in two or three dimensions. For example, an EPS can be used to move a grinding wheel into and out of a grinding location and toward and away from a bearing race. It can also control the angular position of the grinding wheel with respect to the race. It does this with a set of rotary tables or rotary motion assemblies that are stacked on each other in an eccentric fashion; that is, when viewed from above or below, the rotary motion assemblies are not concentrically mounted.

FIG. 1 is a cross-sectional view of an eccentric positioning system 100 with two rotary motion assemblies 101 and 103. Assemblies 101 and 103 may or may not be identical to one another (e.g., they may have identical or different diameters). Assembly 103 is coupled to rotated member 110 of assembly 101, so that assembly 103 is rotated about axis 120 by assembly 101. Assembly 101 comprises fixed member 104, and rotatable member 110 that is rotated by motor 106 (or another rotary motive device, such as a hydraulic actuator, that accomplishes rotary motion) about axis 120. Bearings 107 and 108 provide for such rotary motion. Rotation of member 110 thus causes eccentric motion of assembly 103 about axis 120. Rotatable member 102 of assembly 103 is itself rotatable about axis 122 relative to case 112 by motor 114 and bearings 115 and 116. The two rotary motions in parallel planes (plane A of assembly 101 and plane B of assembly 103) accomplishes two-axis motion of member 102 in plane B of member 102. Any object that is directly or indirectly coupled to member 102 and is not coincident with axis 122 is thus positionable in the plane of motion of the object, which in this case would be parallel to plane B. The motion of the device can follow any straight line or curvilinear path in this plane through proper control of the rotations of motors 106 and 114.

FIGS. 2A-2E illustrate how an eccentric positioning system 10 with three rotary motion assemblies can position an object 18 (for example, a grinding wheel) in the plane of the page. The rotary motion assemblies are modeled as three nested, non-concentric bearings that are coupled as shown in FIG. 2A and described below. Largest bearing 12 encompasses mid-size bearing 14 and smallest bearing 16. The bearings are eccentrically mounted such that they each can rotate about a different but parallel axis; as the rotations take place, these axes may become temporarily coincidental. The bearings are supported such that when the inner race of bearing 12 is rotated, bearings 14 and 16 (and any structures or objects supported by such bearings) are also moved about the axis of rotation of bearing 12. Similarly, when the inner race of bearing 14 is rotated, bearing 16 (and any structures or objects supported by bearing 16) move as well.

The object 18 is directly or indirectly coupled to the inner race of inner bearing 16. Solid circle 13 in FIG. 2A shows the path of the center of bearing 14 when bearing 12 is rotated. Dashed circle 15 in FIG. 2A shows the path of the center of bearing 16 when bearing 14 is rotated. Bearings 12 and/or 14 control the motion of tool 18 in the X-Z plane of its motion, which is parallel to the drawing page. Tool 18 is coupled to bearing 16 such that the tool is rotated about the axis of rotation of bearing 16. Bearing 16 thus controls the angular orientation (theta) of tool 18 in this plane. Bearing 16 affects the X and Z position as well as the angular orientation.

FIGS. 2B and 2C illustrate one specific example of the direction and extent in degrees of rotary motion of bearings 12, 14 and 16 that move object 18, in a generally straight line along the "Z" axis, from the start position shown in FIG. 2B to the end position shown in FIG. 2C. In this example, bearing 12 has an outer diameter (OD) of 43 inches and an inner diameter (ID) of 33.75 inches. Bearing 14 has an OD of 25 inches and an ID of 21.25 inches. Bearing 16 has an OD of 12.75 inches and an ID of 10 inches. The motions include clockwise motion of large bearing 12 amounting to 138.7 degrees, counterclockwise motion of mid-size bearing 14 of 277.2 degrees, and clockwise motion of smallest bearing 16 of 138.5 degrees. These rotary motions cause the object 18 to move 13.963 inches in the "Z" direction. Tool 18 has the same angular orientation at the start and end of this motion, as shown in the drawings. The motions can take place simultaneously or sequentially. The motions are controlled appropriately by the system controller. In situations in which the path of motion is important, straight-line or other purposeful, directed object motion can be accomplished.

FIGS. 2D and 2E illustrate the motions that move object 18 from the start position shown in FIG. 2B to the position shown in FIG. 2D (which is the same as that shown in FIG. 2C), and also down 2.88 inches in the "X" direction. To maintain single-axis linear motion, the overall positioning can take place in two steps—the Z axis motion shown in FIGS. 2B and 2C, and then the X axis motion shown in FIGS. 2D and 2E, in either order. The total (absolute) rotational motion of the inner races of bearings 12, 14 and 16, respectively, are: clockwise 173.5 degrees, counterclockwise 294 degrees, and clockwise 120.4 degrees. Straight-line motion is not a constraint of an eccentric positioning system, as other motion paths can be accomplished by proper control of the two or more relative rotations.

SUMMARY

The eccentric positioning systems described above have several moving parts that are coupled together, with gaps, slits, or other openings between the moving parts (e.g., between the stacked rotary motion assemblies). If contaminants infiltrate the openings in an eccentric positioning system, they can damage the system in several ways. For example, if contaminants reach bearings, gears, motors, or other precision moving parts in the eccentric positioning system, the contaminants can become jammed or embedded between the moving parts, preventing the moving parts from moving properly. Contaminants can also interfere with or block sensors, such as optical encoders, that are used to monitor the positions of the rotary motion assemblies, making the sensor readings faulty or inaccurate. If unchecked, the presence of contaminants in a machine tool can result in substantially decreased accuracy and, eventually, failure of the machine tool.

Contaminants are particularly problematic in environments where eccentric positioning systems are used for machining. For instance, when an eccentric positioning system is used for grinding bearing races, the grinding operation generates swarf, which may take the form of fine chips and/or long, stringy tendrils of material removed from the workpiece. Other machining operations may generate other small pieces of debris, including chips, turnings, filings, and/or shavings. These small pieces of debris can mix with fluid, such as water or oil, and work its way into the bearings and/or optical encoders in an eccentric positioning system, degrading the eccentric positioning system's positioning precision.

Embodiments of the present technology include a positioning system. The positioning system includes a first rotary motion table and a gas source. The first rotary motion table comprises a first base, a first platform rotatably coupled to the first base, and a first motor to rotate the first platform about a first axis. The gas source is in fluid communication with a first cavity between the first platform and the first base. The gas source pressurizes the first cavity. The gas flows out of the first cavity through a first channel between the first base and the first platform to prevent ingress of particles into the first cavity.

The positioning system may include a second rotary motion table comprising a second base fixed to the first platform, a second platform rotatably coupled to the second base, and a second motor to rotate the second platform about a second axis parallel to the first axis. The first platform and the second base may form a conduit connecting the first cavity with a second cavity between the first platform and the first base. The gas source may be in fluid communication with the second cavity via the first cavity and the conduit and may be configured to pressurize the second cavity.

The positioning system may further include a tool. The tool may be disposed on the second platform. The tool may be configured to be positioned relative to a workpiece by the first rotary motion table and the second rotary motion table. The tool may machine the workpiece. Pressurization of the first cavity and the second cavity by the gas source may prevent swarf generated by machining the workpiece from entering the first cavity or the second cavity. The gas may flow out of the first cavity through the first channel between the first base and the first platform and out of the second cavity through a second channel between the second base and the second platform.

The positioning system may further include an air conditioner. The air conditioner may be in fluid communication with the gas source. The air conditioner may heat and/or cool the gas flowing into the first cavity. The positioning system may further include a temperature sensor and a controller. The temperature sensor may be in thermal communication with the first rotary motion table. The temperature sensor may measure a temperature of the first rotary motion table. The controller may be operably coupled to the temperature sensor and the air conditioner, to control a temperature of the gas based on the temperature of the first rotary motion table. The temperature sensor may be a first temperature sensor, and the system may further include a second temperature sensor. In one implementation, the second temperature sensor may be in thermal communication with a coolant and/or cutting fluid supplied to a machine tool. The second temperature sensor may be operably coupled to the controller. The machine tool may be operably coupled to and positioned by the positioning system. The temperature measured by the second temperature sensor may be used as a temperature setpoint by the controller. In another implementation, the second temperature sensor may be in thermal communication with an ambient temperature and operably coupled to the controller. The temperature measured by the second temperature sensor may be used as a temperature setpoint by the controller.

The first channel in the positioning system may be labyrinthine. The positioning system may further include a shield. The shield may be disposed over an outlet of the first channel to prevent ingress of liquid into the first cavity.

Other embodiments of the present technology include a contaminant control system. The contaminant control system includes a source supplying a gas flow, a channel fluidly coupled to the source to direct the gas flow, a pressure sensor disposed within the channel, a machine tool, a cutting tool, and a controller. The machine tool includes an enclosure. The enclosure includes moving components disposed within the enclosure; an inlet fluidly coupling the channel and the enclosure; and at least one outlet to direct the gas flow out of the enclosure. The cutting tool is disposed on an outside surface of the enclosure. The cutting tool is operably coupled to the moving components. The controller is operably coupled to the source supplying the gas flow and the pressure sensor. The gas flow prevents at least some contaminants generated by the cutting tool from entering the enclosure. The contaminants in the contaminant control system may include at least one of machining chips or grinding swarf. The gas flow in the contaminant control system may create a pressure within the enclosure about 0.5 inches of water to about 100 inches of water above an ambient pressure.

The moving components in the machine tool may include precision positioning components. The precision positioning components may include a first assembly and a second assembly. The first assembly includes a first rotatable portion that is rotatable about a first axis. The second assembly includes a second rotatable portion that is rotatable about a second axis that is not coincident with the first axis. The assemblies may be coupled such that rotation of the first rotatable portion causes eccentric rotation of the second rotatable portion about the first axis.

The contaminant control system may further include a temperature conditioner. The temperature conditioner may be fluidly coupled to the channel and operably coupled to the controller. The temperature conditioner may be configured to condition (e.g., heat and/or cool) a temperature of the gas flow. At least one temperature probe may be disposed within the enclosure and operably coupled to the controller. In one implementation, the temperature conditioner may heat the gas flow to about 5° C. above an ambient temperature to about 20° C. above the ambient temperature. In another implementation, the temperature conditioner may condition the temperature of the gas flow between about 5° C. less than or greater than an ambient temperature. In another implementation, the temperature conditioner may cool the temperature of the gas flow to about 5° C. below an ambient temperature to about 20° C. below the ambient temperature.

The source supplying a gas flow in the contaminant control system may include a source of pressurized gas. The contaminant control system may further include a pressure regulator and a first valve. The pressure regular may be disposed between the source and the channel. The first valve may be disposed between the source and the inlet and operably coupled to the controller. The source may comprise at least one of a fan or a blower.

Other embodiments of the present technology include a method of controlling contaminants in a machine tool. The machine tool includes an enclosure and a cutting tool. The enclosure includes moving components, an inlet, a pressure sensor, and at least one outlet. The moving components are disposed within the enclosure. The inlet fluidly couples the enclosure to a source supplying a gas flow to direct the gas flow into the enclosure. The pressure sensor is disposed within the enclosure. The at least one outlet directs the gas flow out of the enclosure. The cutting tool is disposed on an outside surface of the enclosure. The cutting tool is operably coupled to the moving components in the enclosure. The method of controlling contaminants includes regulating the gas flow through the machine tool using a controller. The controller is operably coupled to the pressure sensor and the source supplying the gas flow. The gas flow prevents at least some contaminants generated by the cutting tool from entering the enclosure. Controlling the gas flow may include creating a pressure within the enclosure of about 0.5 inches of water above an ambient pressure to about 100 inches of water above the ambient pressure.

The method of controlling contaminants may further include conditioning a temperature of the gas flow and measuring a temperature within the enclosure. A temperature conditioner operably coupled to the controller may be used to conditioning the temperature of the gas flow. A temperature probe operably coupled to the controller may be used to measure the temperature within the enclosure. Conditioning the temperature of the gas flow may include heating the gas flow to about 5° C. above an ambient temperature to about 20° C. above the ambient temperature. Conditioning the temperature of the gas flow may include conditioning the temperature of the gas flow between about 5° C. less than or greater than an ambient temperature. Conditioning the temperature of the gas flow may include cooling the gas flow to about 5° C. below an ambient temperature to about 20° C. below the ambient temperature.

Other embodiments of the present technology include a contaminant control system. The contaminant control system includes a source, a channel, a positioning system, and a controller. The source supplies a gas flow. The channel is fluidly coupled to the source to direct the gas flow. The positioning system is fluidly coupled to the channel via an inlet disposed in the positioning system. The positioning system includes a first assembly, a second assembly, at least one outlet, and a first pressure sensor. The first assembly comprises a first rotatable portion that is rotatable about a first axis. The second assembly comprises a second rotatable portion that is rotatable about a second axis that is not coincident with the first axis. The at least one outlet is fluidly coupled to at least one of the first assembly or the second assembly to direct the gas flow out of the positioning system. The first pressure sensor is disposed within at least one of the first assembly or the second assembly. The controller is operably coupled to the gas compressor and the first pressure sensor. The gas flow prevents at least some contaminants from entering the positioning system. The contaminant control system may further include a temperature conditioner fluidly coupled to the channel to condition the temperature of the gas flow.

All combinations of the foregoing concepts and additional concepts discussed in greater detail below (provided such concepts are not mutually inconsistent) are part of the inventive subject matter disclosed herein. All combinations of claimed subject matter appearing at the end of this disclosure are part of the inventive subject matter disclosed herein. The terminology used herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

DETAILED DESCRIPTION

Figure 1:
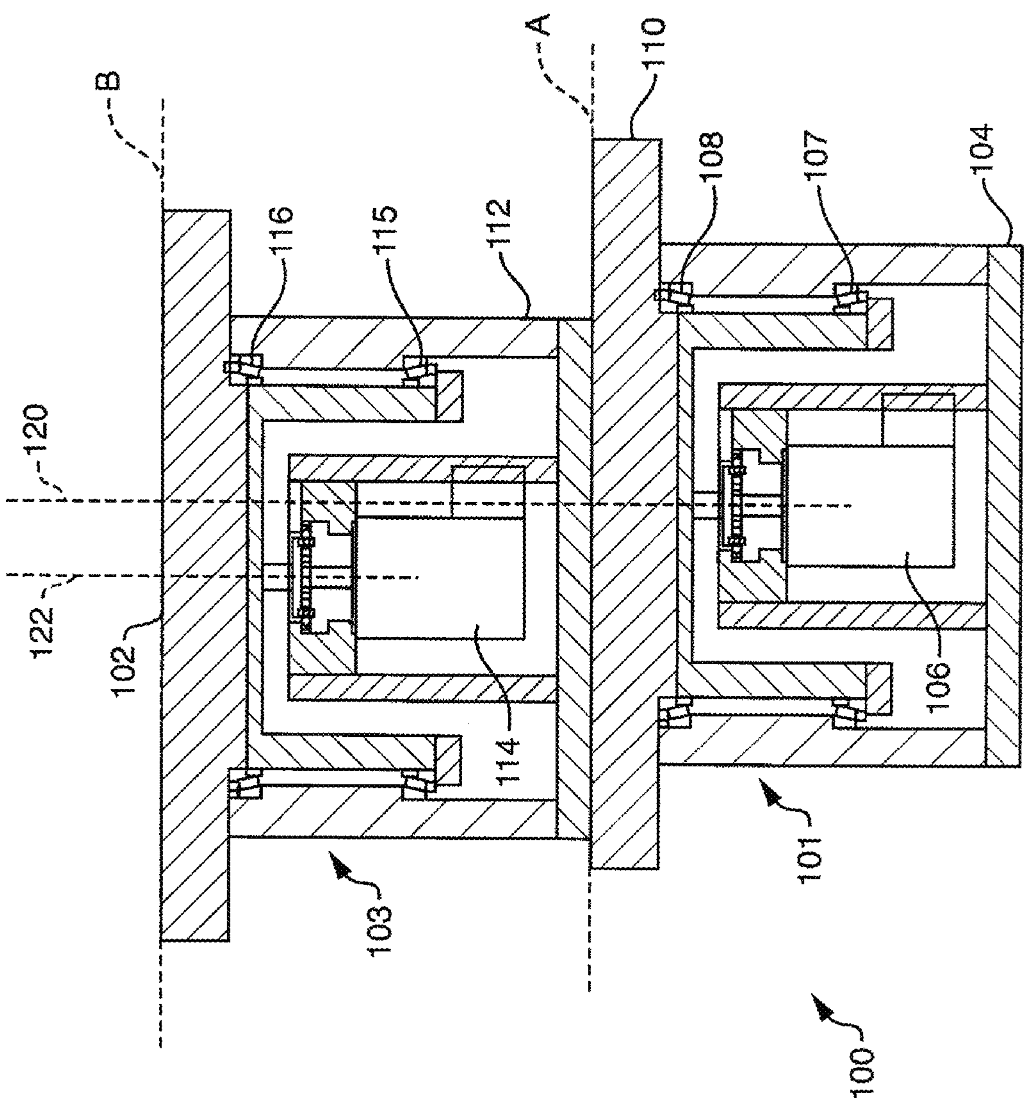
FIG. 1 is a cross-sectional view of an eccentric positioning system with two rotary motion assemblies.
Figure 2A:
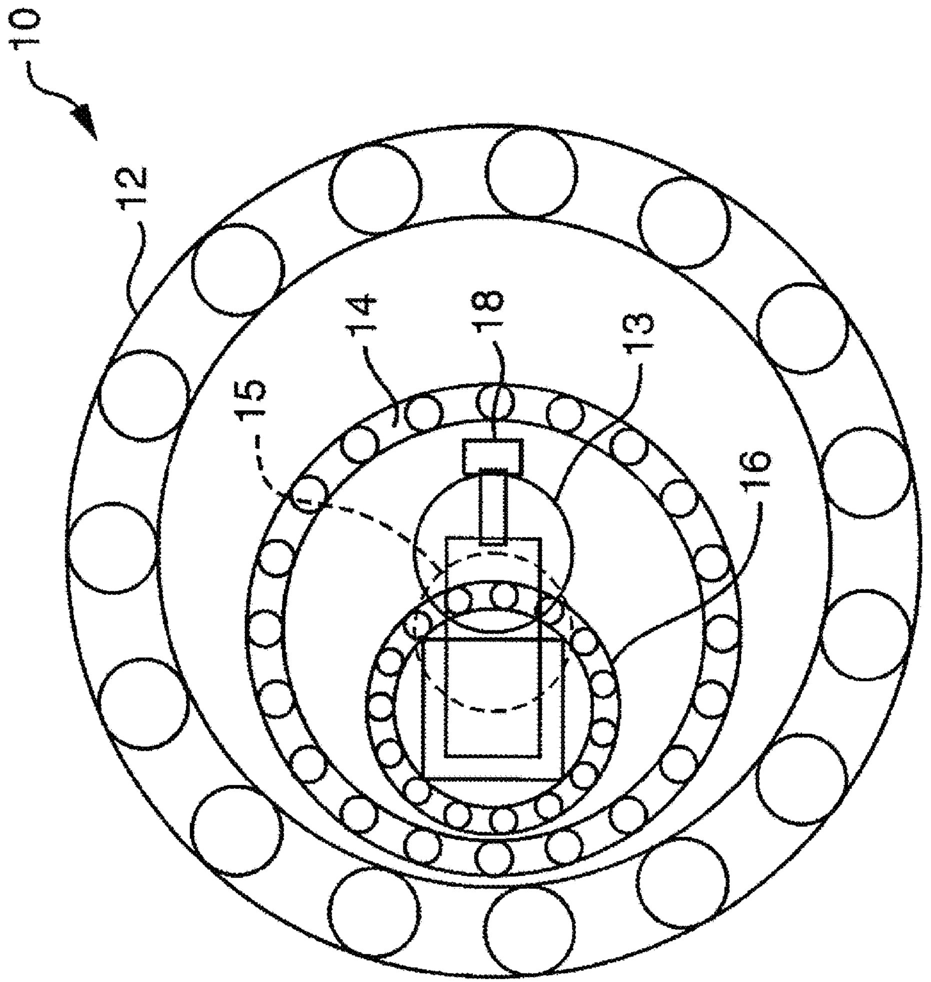
FIGS. 2A-2E illustrate operation, along a top view, of an eccentric positioning system with three rotary motion tables modeled as three bearings.
Figure 2C:
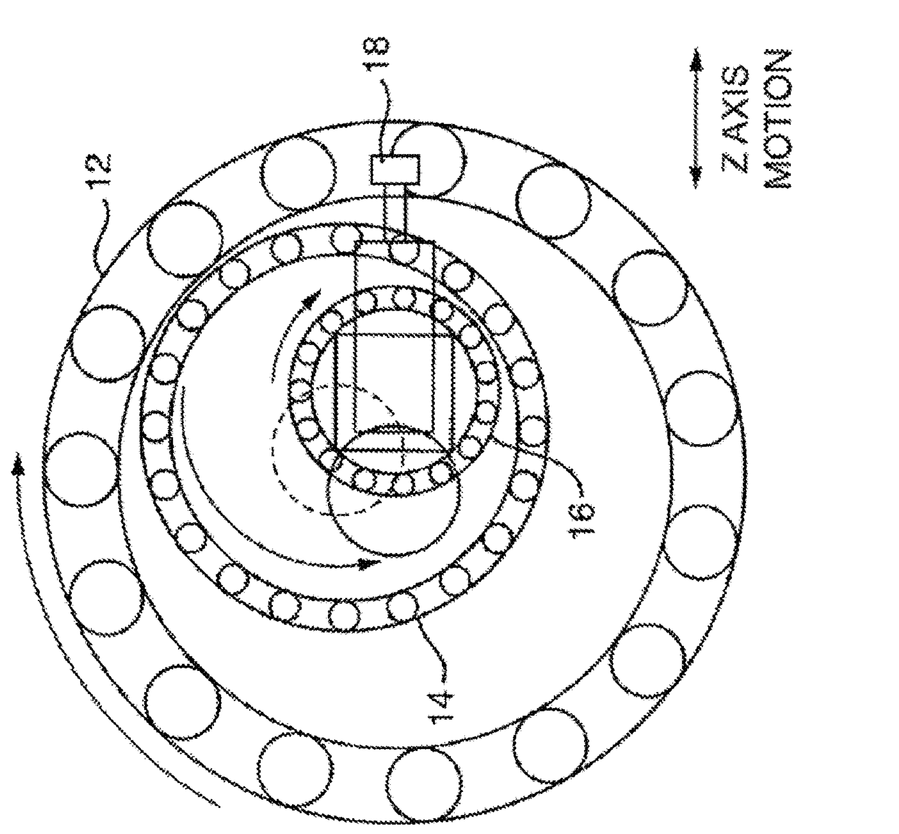
Figure 2B:
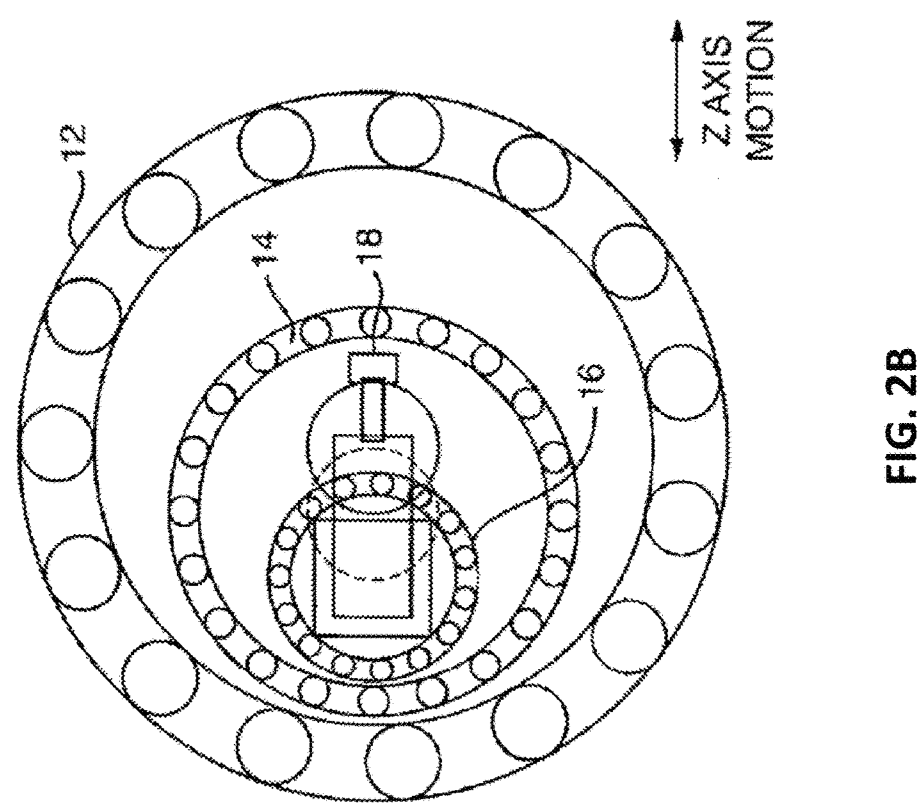
Figure 2E:
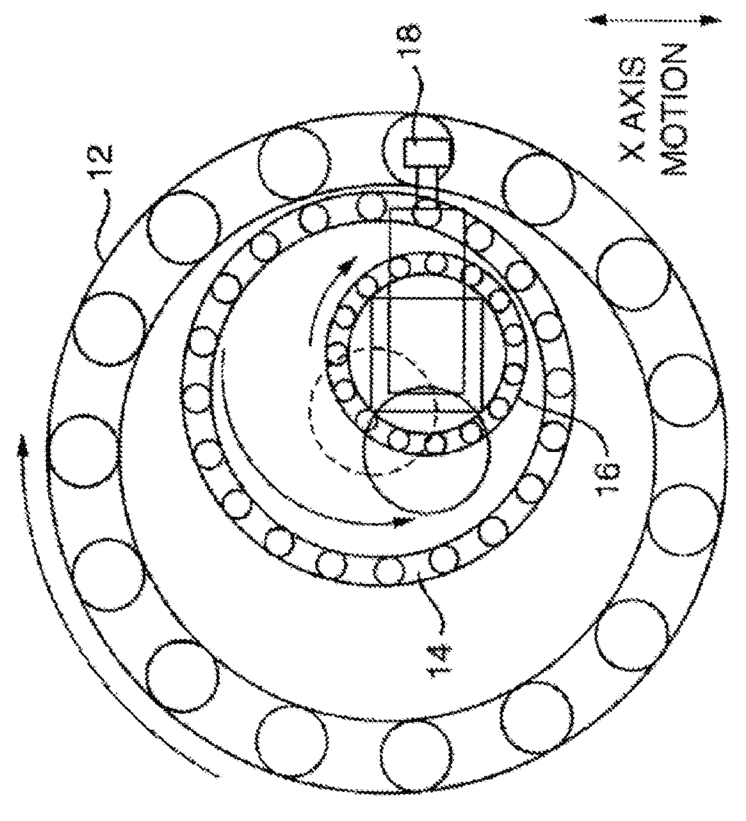
Figure 2D:
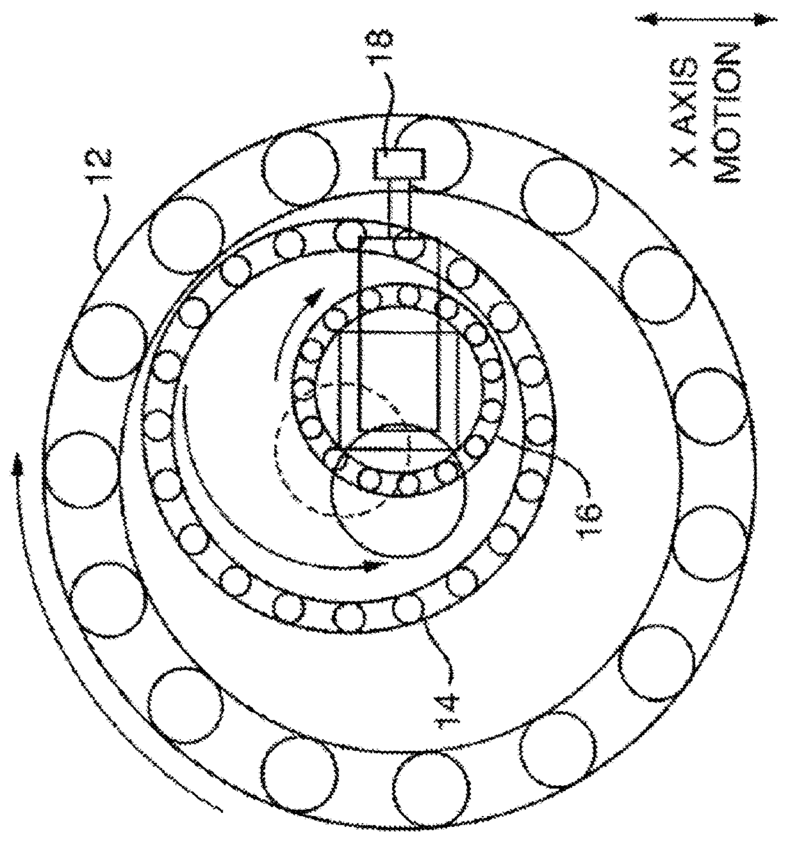

Inventive aspects of the present application include a contaminant control system that can be integrated with a positioning system, such as an eccentric positioning system. The contaminant control system prevents or substantially reduces the ingress of swarf, chips, filings, turnings, shavings, and/or contaminants into the positioning system. In this way, the contaminant control system prevents damage to and/or malfunction of the positioning system caused by contaminants entering the positioning system and fouling the positioning system's bearings, gears, encoders, and/or other components.

The contaminant control system prevents the ingress of contaminants into the positioning system by directing an inert gas flow through the interior of the positioning system. The contaminant control system controls the flow rate of the gas such that the gas pressure within the positioning systems that is greater than the ambient air pressure. This overpressure causes the gas to flow out of any gaps, apertures, openings, slits, slots, and/or seams in the positioning system, preventing contaminants from entering the positioning system through those same gaps, apertures, openings, slits, slots, and/or seams.

The contaminant control system includes a controller that controls the gas flow through the positioning systems. The controller may be a programmable logic controller. This controller can be the same as or separate from the processor or controller that controls the positioning operations of the positioning system. The contaminant control system also includes one or more sensors positioned within the positioning system and coupled to the controller via analog-to-digital inputs to provide feedback to the controller. One or more gas regulators and valves may also be integrated with the system and coupled to the controller to provide control of the gas flow direction, volume of gas flow, speed of gas flow, and the internal pressure within the positioning system.

The contaminant control system can generate the inert gas flow using any of several sources and techniques. In one embodiment, the gas flow is created using a source of pressurized gas. For example, the pressurized gas may be supplied by a gas compressor (e.g., an industrial air compressor). As another example, the pressurized gas may be supplied by a pressurized gas cylinder. In this embodiment, the gas flow may be controlled with one or more gas regulators, valves, and/or bleed ports. In another embodiment, the gas flow is created with a fan or blower that blows ambient air through the positioning system. Any fan that creates sufficient air pressure may be used (e.g., a regenerative fan). In this case, a screen or filter prevents the fan or blower from sucking fine particles into the positioning system. In this embodiment, the gas flow may be controlled by varying the speed of the fan or blower. The contaminant control system can flow a pure gas or a mixture of gases through a positioning system. Examples of suitable gases include air, nitrogen, and argon. In one embodiment, a single gas flow source is coupled to several positioning systems. In another embodiment, several gas flow sources are coupled to a positioning system to provide greater gas flow or prevent downtime due to the failure of a gas flow source.

One or more gas flow channels are used to couple the source of the gas flow to the positioning system. The gas flow channels may include ducts, pipes, or tubing (e.g., PVC pipes or sheet metal ducts). The gas flow channels are sized according to the pressure and gas flow specifications. Gas flow channels can be joined together via connectors, adhesive, welding, and/or riveting. For example, PVC pipes can be joined via connectors and PVC adhesive. Metal ducts can be joined via welding, bolting, and/or riveting.

One or more valves may be disposed within the gas flow channels to control or regulate gas flow. Valves may include on/off control valves (e.g., ball valves, butterfly valves, diaphragm valves, gate valves, poppet valves, or solenoid valves) and/or metering valves (e.g., diaphragm valves, globe valves, needle valves, or solenoid valves). Valves may also include check valves, pressure reducing valves, and/or pressure relief valves.

At least one gas pressure sensor is integrated into the contaminant control system to provide feedback to the controller. This gas pressure sensor monitors the internal pressure within the positioning system. The controller may control the internal pressure within the positioning system so that the internal pressure remains at a desired internal pressure. For example, the desired internal pressure may be greater than about 0.5 inches of water above ambient air pressure to about 100 inches of water above air pressure (e.g., 1.0, 2.5, 5.0, 10, 25, 50, or 75 inches of water). Other gas pressure sensors may be placed along gas flow channels between the source of the gas and the positioning system. Many types of gas pressure sensors may be used, including piezoresistive strain gauges, capacitive pressure sensors, electromagnetic pressure sensors, and piezoelectric pressure sensors. In the case that a sensor fails, the gas flow source may default to a predetermined gas flow to create the targeted pressure range.

In addition to providing contaminant control, the contaminant control system may provide further benefits by providing temperature control. Machine tool precision and accuracy suffers if the temperature of the positioning system varies. Temperature changes cause thermal expansion and thermal contraction within the positioning system. These thermal effects degrade the machine tool's accuracy and precision. The accuracy and precision of a machine tool can be improved by controlling its temperature. Temperature control can prevent or reduce thermal effects.

The contaminant control system may provide temperature control by conditioning the temperature of the gas before and/or while the gas flows through the positioning system. By controlling the temperature of the gas, the type of gas, and the speed and volume of gas flow, the controller can also control the temperature of the positioning system. Gas from the gas flow source may be directed through a temperature conditioner before entering the positioning system. In one embodiment the temperature conditioner provides gas heating only, for example, using a heater. In another embodiment, the temperature conditioner provides both heating and cooling, for example, using a heat pump or combination heater and air conditioner. In another embodiment, the temperature conditioner provides cooling only, for example, using an air conditioner.

In the embodiments in which the contaminant control system controls the temperature, the contaminant control system also includes at least one temperature probe. The temperature probe is disposed within or in thermal communication with the positioning system to measure the temperature within the positioning system. The temperature probe may be in contact or not in contact with a surface of the positioning system. Preferably, the temperature probe is in direct contact with a surface of the positioning system. The temperature probe is coupled to the controller to provide feedback to control the temperature conditioner. Other temperature probes may be placed along the gas flow channels between the source of the gas and the positioning system. Any suitable type of temperature probe may be used, including thermocouples and thermistors.

In one embodiment, a temperature probe operably coupled to the controller is thermally coupled to a cutting, grinding, or milling tool mechanically coupled to and positioned by the positioning system. In this embodiment, the temperature probe may be disposed on a surface of the cutting, grinding, or milling tool and/or thermally coupled to a coolant or cutting fluid supplied to the cutting, grinding, or milling tool. The temperature of the coolant or cutting fluid supply may be set and controlled using a cutting, grinding, or milling tool controller. The temperature measured by the temperature probe thermally coupled to the cutting, grinding, or milling tool and/or the coolant or cutting fluid may be used as a temperature setpoint for the temperature conditioner coupled to the positioning system. The temperature conditioner providing both heating and cooling may condition the temperature of the gas to a range of temperatures in relation to the temperature of the coolant supply or the cutting, grinding, or milling tool. The range of temperatures may be within ±20° C. of the temperature of the coolant supply or the cutting, grinding, or milling tool (e.g., ±0.1° C., ±0.25° C., ±0.5° C., ±1° C., ±2° C., ±5° C., or ±10° C.). In this way, the temperature of the positioning system and the temperature of the cutting, grinding, or milling tool may be substantially similar to reduce detrimental effects caused by temperature variation.

In another embodiment, the temperature controller may be configured to heat the positioning system about 5° C. above ambient temperature to about 20° C. above ambient temperature. In this embodiment, a temperature probe operably coupled to the controller is thermally coupled to the ambient temperature. This embodiment is preferable where a consistent temperature in the position system is desirable and the contaminant control system does not include a cooling function. The contaminant control system may not include a cooling function in order to save on costs or space. In another embodiment, the temperature controller may be configured to maintain the positioning system at a temperature within 5° C. of the ambient temperature. This temperature range is preferable for grinding process control but uses both heating and cooling functions. In another embodiment, the temperature controller may be configured to maintain the positioning system at a temperature of about 5° C. to about 20° C. below the lowest expected ambient temperature. This embodiment is preferable where maintaining a temperature below the ambient temperature is preferred for all season operation.

The controller may use an algorithm to control the gas flow and the temperature of the gas. The controller may control heating, cooling, fan speed, and valves to control gas flow and temperature. The controller controls gas flow within a dead band limit set for one or more pressure sensors within the system. In the event of a pressure sensor failure, the controller reverts the flow rate of the gas to a default constant predetermined setting to substantially prevent contaminant ingress into the positioning system. The controller also controls the temperature of the system by turning the heater on when heat is demanded until the temperature measured at the outlet of the system reaches an upper set point, after which the heater is pulsed until the enclosure temperature remains within a temperature band.

If one of the temperature sensors fails, the temperature control system sends a warning to the operator and relies on other temperature sensors in the system. If all of the temperature probes fail, the controller sends a warning to the operator and stops temperature control.

Figure 3:
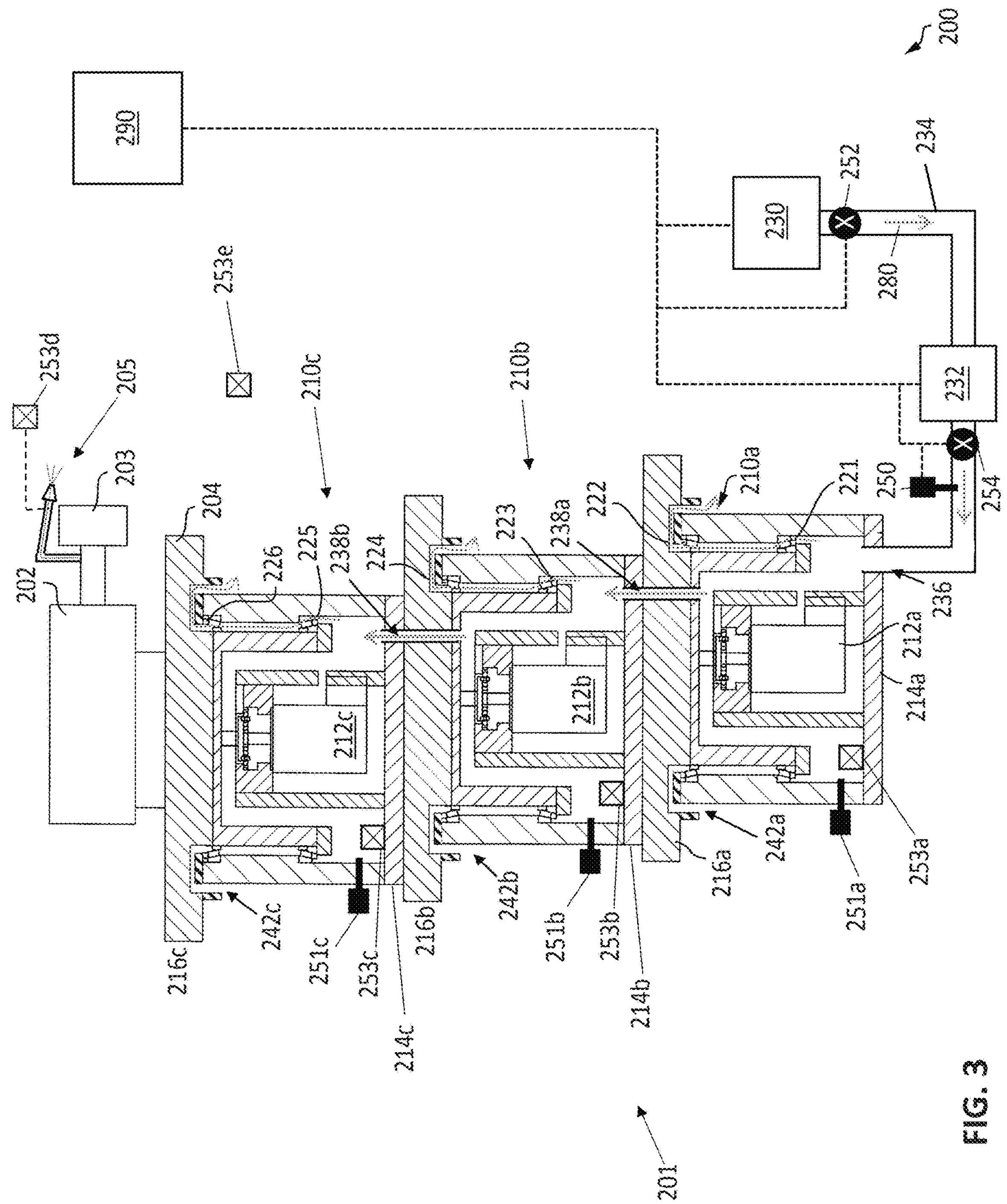
FIG. 3 is a cross-sectional view of a three-rotation eccentric positioning system integrated with a contaminant control system.

FIG. 3 is a cross-sectional view of a contaminant control system 200 integrated with an eccentric positioning system 201 with three rotary motion assemblies 210*a*-210*c* stacked to provide three eccentric rotary motions. Each rotary motion assembly 210 comprises a fixed portion or base 214 and a drive, motor, or actuator 212 that rotates a movable member or platform 216 with respect to the base 214. Each drive 212 has an optical encoder built into it for sensing the angular position of the platform 216 with respect to the base 214. Each drive 212 is in a cavity or enclosure formed by the base 214 and platform 216 of the corresponding rotary motion table 210. There are small (e.g., 0.5 mm wide) gaps, channels, conduits, or passages between 242*a*-242*c* between the respective bases 214 and platforms 216. The gaps 242 extend around the circumferences of the respective rotary motion tables 210 and serve as potential points of ingress for swarf and other contaminants into the cavities that contains the drives 212 and other moving parts of the rotary motion tables 210. Swarf and other contaminants can also obscure the optical encoders, deteriorating precision of the positioning system.

Bearings 221-226 positioned between the bases 214 and platforms 216 of the rotary motion tables 210 allow the rotary motion table platforms 214 to rotate freely with respect to their respective bases 216. For example, bearings 221 and 222 rotatably couple the platform 216*a* of the bottom rotary motion table 210*a* to the base 214*a* of the of the bottom rotary motion table 210*a*. This allows the platform 216*a* to rotate freely with respect to the base 214*a*.

The bearings 221-226 also allow the rotary motion assemblies 210*a*-210*c* to rotate freely (and eccentrically) with respect to each other because the base 214*b* of the middle rotary motion table 210*b* is fixed to the platform 216*a* of the bottom rotary motion table 210*a* and the base 214*c* of the top rotary motion table 210*c* is fixed to the platform 216*b* of the middle rotary motion table 210*b*. In this case, the bearings 221-226 are not nested one within the other, but nested bearings may be used in other embodiments of eccentric positioning systems.

The object to be positioned, e.g., a cutting or grinding tool 202, is mounted to an exterior surface 204 of the platform of the upper table 210*c*. The positioning system 201 accomplishes Z and X motions within the plane in which cutting tool 202 is mounted, as well as angular motion of the working end 203 of cutting tool 202 within that plane in a fashion like that illustrated in FIGS. 2A-2E.

The contaminant control system 200 includes a gas source 230, a duct 234 coupling the gas source 230 to the positioning system 201, a pressure sensor 251, and a controller 290. The contaminant control system 200 may additionally include a temperature conditioner 232, valves 252 and 254, and pressure sensor 250. The gas source 230, temperature conditioner 232, valves 252 and 254, and sensors 251 are operably coupled to the controller 290. The controller 290 controls the flow of gas 280 (indicated by arrows) from the gas source 230 into the positioning system 201 via an inlet 236. It also controls the temperature of the gas flow 280 as it leaves the temperature conditioner 232. Pressure sensors 251 may be placed in one or several rotary motion assemblies to provide additional feedback to the controller 290.

Temperature sensors 253*a*-253*c* may be disposed on an inner surface of the rotary motion assemblies near the gas outlets 242 and coupled to the controller 290. Temperature sensors 253*a*-253*c* may provide feedback to the controller 290 as part of a sensor feedback loop. The temperature sensor 253*d* may be disposed on a coolant supply nozzle 205 or otherwise thermally coupled to the coolant in the coolant supply nozzle that regulates the temperature of the cutting or grinding tool 202. Alternatively, temperature sensor 253*d* may be disposed on or otherwise thermally coupled to the cutting or grinding tool 202. For example, the temperature sensor 253*d* may be disposed on or near the working end 203 of the cutting tool. The temperature sensor 253*d* may provide feedback to the controller 290 that sets a targeted temperature range in relation to the temperature of the cutting or grinding tool 202 or the temperature of the coolant used in the cutting or grinding tool 202. The temperature sensor 253*e* measures ambient air temperature. Temperature sensor 253*e* may be operably coupled to the controller 290 to provide feedback to the controller 290 that sets a targeted temperature range in relation to the ambient air temperature.

In operation, the gas flow 280 enters the cavity in the bottom rotary motion table 210_a_ through the channel 236. It increases the pressure inside the cavity to above the ambient air pressure (e.g., by about 0.5 inches $H_2O$ above the ambient air pressure). As a result, the gas blows out of the cavity through the bearings 221 and 222 and the gap 242_a_ between the base 214_a_ and the platform 216_a_. This blowing gas flow 280 pushes swarf, chips, filings, and other small particles away from the gap 242_a_, preventing them from infiltrating the first rotary motion table 210_a_ and jamming the bearings 221 and 222 and the drive 212_a_.

The gap, channel, or passage 242_a_ may have a labyrinthine geometry to create a tortuous gas transport path. The gap 242_a_ may be defined by structures to create several bends in the gas transport path. For example, the structures may create about 2 to about 20 bends in the gas transport path (e.g., 2, 3, 4, 5, 10, or 20 bends). The width or diameter of this path can be constant (e.g., 0.5 mm) or it can get narrower at discrete points (e.g., at the bends or corners) or it can narrow from the outside in. The structures may be adhered to the base 214_a_ and/or the platform 216_a_ via spot welding, bolts, claims, and/or adhesives. The structures may be made of a metal that resists corrosion, plastic deformation, and denting (e.g., stainless steel). In addition to creating a tortuous gas transport path, the labyrinthine geometry also provides a barrier to prevent or reduce liquids (e.g., coolant, oil, or water) entering the cavity through the gap 242_a_.

A channel or passageway 238_a_ through the platform 216_a_ of the bottom rotary motion table 210_a_ and the base 214_b_ of the middle rotary motion table 210_b_ connects the enclosure in the bottom rotary motion table 210_a_ with the enclosure in middle rotary motion table 210_b_. Another channel or passageway 238_b_ through the platform 216_b_ of the middle rotary motion table 210_b_ and the base 214_c_ of the top rotary motion table 210_c_ connects the enclosure in the middle rotary motion table 210_b_ with the enclosure in top rotary motion table 210_c_. (Recall that the platform 216_a_ is fixed to the base 214_b_, and the platform 216_b_ is fixed to the base 214_c_.) This allows the gas flow 280 to propagate up through the interior of the stacked rotary motion tables 210, increasing the air pressure within the enclosures in the middle rotary motion table 210_b_ and top rotary motion table 210_c_. The gas flows out of the interior through the bearings 222-226 and circumferential gaps 242_b_ and 242_c_, stopping debris from penetrating the rotary motion tables 210 and clogging the bearings 222-226 and motors 212. The gaps, channels, conduits, or passages 242_b_ and 242_c_ may have a labyrinthine geometry to create a tortuous gas transport path that is identical or similar to the gap 242_a_ described above.

Figure 4:
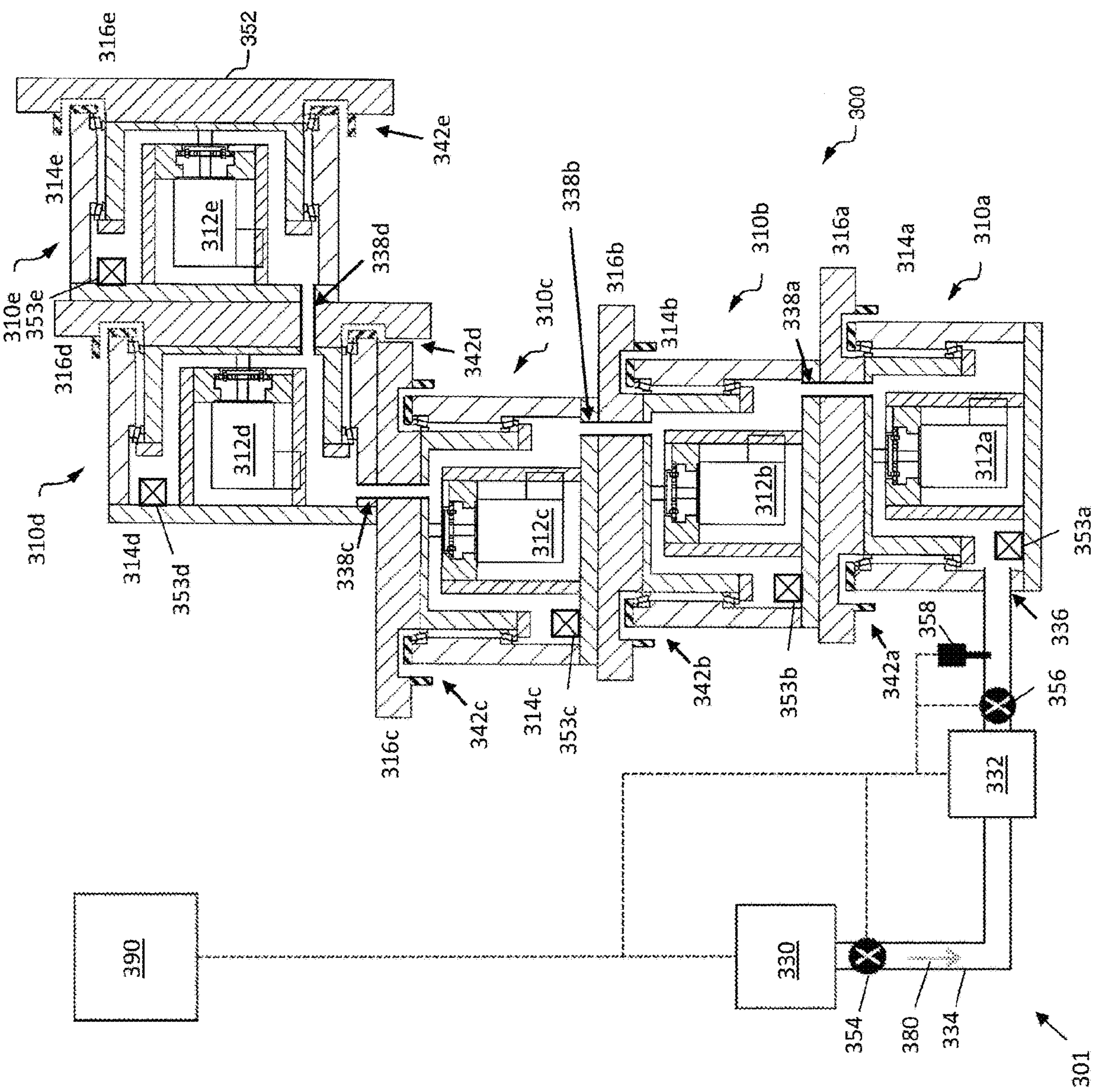
FIG. 4 is a cross-sectional view of five-rotation eccentric position system integrated with a contaminant control system.

FIG. 4 shows another embodiment of a contaminant control system 301 integrated with a positioning system 300. The positioning system 300 controls the position in three-dimensional space and rotation about one axis of an object (e.g., a grinding wheel or other machine tool; not shown) coupled to rotated table member 352. System 300 comprises five rotary motion assemblies 310_a_-310_e_ with respective motors 312_a_-312_e_, fixed bases 314_a_-314_e_, and rotating platforms 316_a_-316_e_. As in FIG. 3, each motor 312 is in a cavity formed between the corresponding base 314 and platform 316, with a circumferential gap 342 between the base 314 and platform 316.

The rotary motion assemblies 310 are stacked on top of each other, with the base 314 of each rotary motion assembly 310 fixed to the platform 316 of the rotary motion assembly 310 below. Assembly 310_d_ is mounted such that its axis of rotation is orthogonal to the three noncoincident but parallel rotation axes of assemblies 310_a_-310_c_. The rotation axis of assembly 310_e_ is parallel to, but not coincident with, that of assembly 310_d_. In each assembly 310, the motor 312 is fixed to the platform 316. One or more bearings (not labeled) between the base 314 and platform 316 allow the motor 312 to spin the platform 316 with respect to the base 314 about the assembly's 310 axis to provide five degrees of positioning freedom.

Like the contaminant control system 200 in FIG. 3, the contaminant control system 301 in FIG. 4 includes a gas source 330, a duct 334 coupling the gas source to the cavities in the rotary motion tables 310, and a controller 390. The contaminant control system may additionally include a temperature conditioner 332, valves 354 and 556, and pressure sensor 358. Any valves or temperature sensors present in the contaminant control system 301 are coupled to the controller. The controller 390 controls the flow of gas 380 from the gas source 330 and into the positioning system 300 via an inlet 336. Temperature sensors 353_a_-353_c_ may be disposed on an inner surface of the rotary motion assemblies near the gas outlets 342 and coupled to the controller 390.

The positioning system 300 includes five enclosures, one in each rotary motion assembly 310, fluidly coupled together via channels or passageways 338_a_-338_d_. The gas 380 pressurizes these enclosures, with excess gas flowing between enclosures through the channels 338 and out of the enclosures via the bearings and gaps 342. This stops chips and other particles from entering the enclosures via the gaps 342 and getting caught in the bearings, motors 312, and/or other moving components in the positioning system 300. The gaps 342 may have a labyrinthine geometry to create a tortuous gas transport path as described above.

Figure 5:
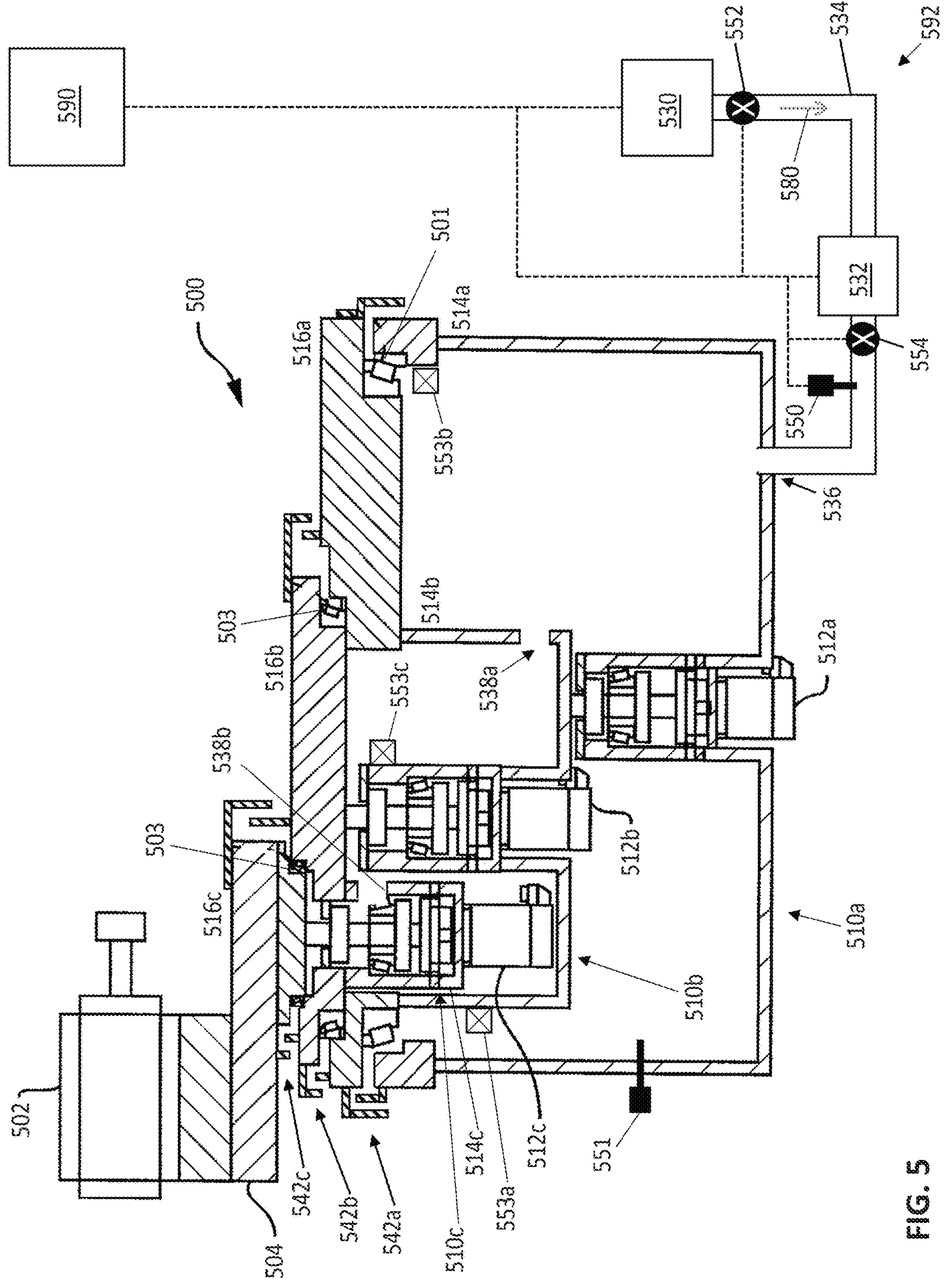
FIG. 5 is a cross-sectional view of an alternative three-rotation eccentric position system integrated with a contaminant control system.

FIG. 5 shows another embodiment of a contaminant control system 592 integrated with an eccentric positioning system 500 with three nested rotary motion tables 510_a_-510_c_. The rotary motion tables 510_a_-510_c_ includes respective motors 512_a_-512_c_, fixed bases 514_a_-514_c_, and rotating platforms 516_a_-516_c_. The motors 512_a_-512_c_ are laterally offset from one another sufficiently such that they do not need to be stacked as in other versions of positioning systems. The motors 512_a_-512_c_ are sealed such that contamination is not significant and the gas 580 does not flow through the motors. The lateral offset of the motors decreases the height of the system.

As in the other systems, the motors 512 spin the respective platforms 516 about offset, parallel axes of rotation. Bearings 501, 503, and 505 allow the platforms 516 to rotate freely with respect to the bases 514. The base 514_b_ of the middle rotary motion table 514_b_ is fixed to the platform 516_a_ of the bottom rotary motion table 514_a_ and the base 514_c_ of the top rotary motion table 514_c_ is fixed to the platform 516_b_ of the middle rotary motion table 514_b_, so actuating the motors 512 causes the platforms 516 to move with respect to each other. The positioning system 500 accomplishes Z, X, and angular positioning of cutting tool 512 in the plane of the cutting tool that is parallel to rotated member 510.

The contaminant control system 592 includes a gas source 530, a duct 534 coupling the gas source to the positioning system 500, a pressure sensor 551, and a controller 590. The contaminant control system may additionally include a temperature conditioner 532, valves 552 and 554, and pressure sensor 550. Any valves or temperature sensors present in the contaminant control system are coupled to the controller to provide feedback. The controller 590 controls the flow of gas 580 from the gas source 530 and into the positioning system 500 via an inlet 536. Pressure sensor 551 may be placed in a rotary motion assembly to provide additional feedback to the controller 590. Temperature sensors 553*a*-553*c* may be disposed on an inner surface of the rotary motion assemblies near the gas outlets 542.

The gas 580 pressurizes three enclosures or cavities in the positioning system 500: a first cavity between base 514*a* and platform 516*a*, a second cavity between base 514*b* and platform 516*b*, and a third cavity between base 514*c* and platform 516*c*. The first cavity is fluidly coupled to the second cavity via channel 538*a*, and the second cavity is fluidly coupled to the third cavity via channel 538*c*. The positioning system 500 includes circumferential outlets 542*a*-542*c* between the bases 514 and platforms 516 that allow the gas to exit the pressurized cavities. The gas blows out of these outlets 542, preventing contamination from entering them. The gaps 542 may have a labyrinthine geometry to create a tortuous gas transport path as described above.

Any type of machine tool (e.g., milling, grinding, or turning machines) where contaminants are a concern may be designed with or modified to include a contaminant control system according to the inventive aspects of the present application. The contaminant control system is applicable to any machine with moving parts where contaminants may be generated, not just positioning systems.

Figure 6:
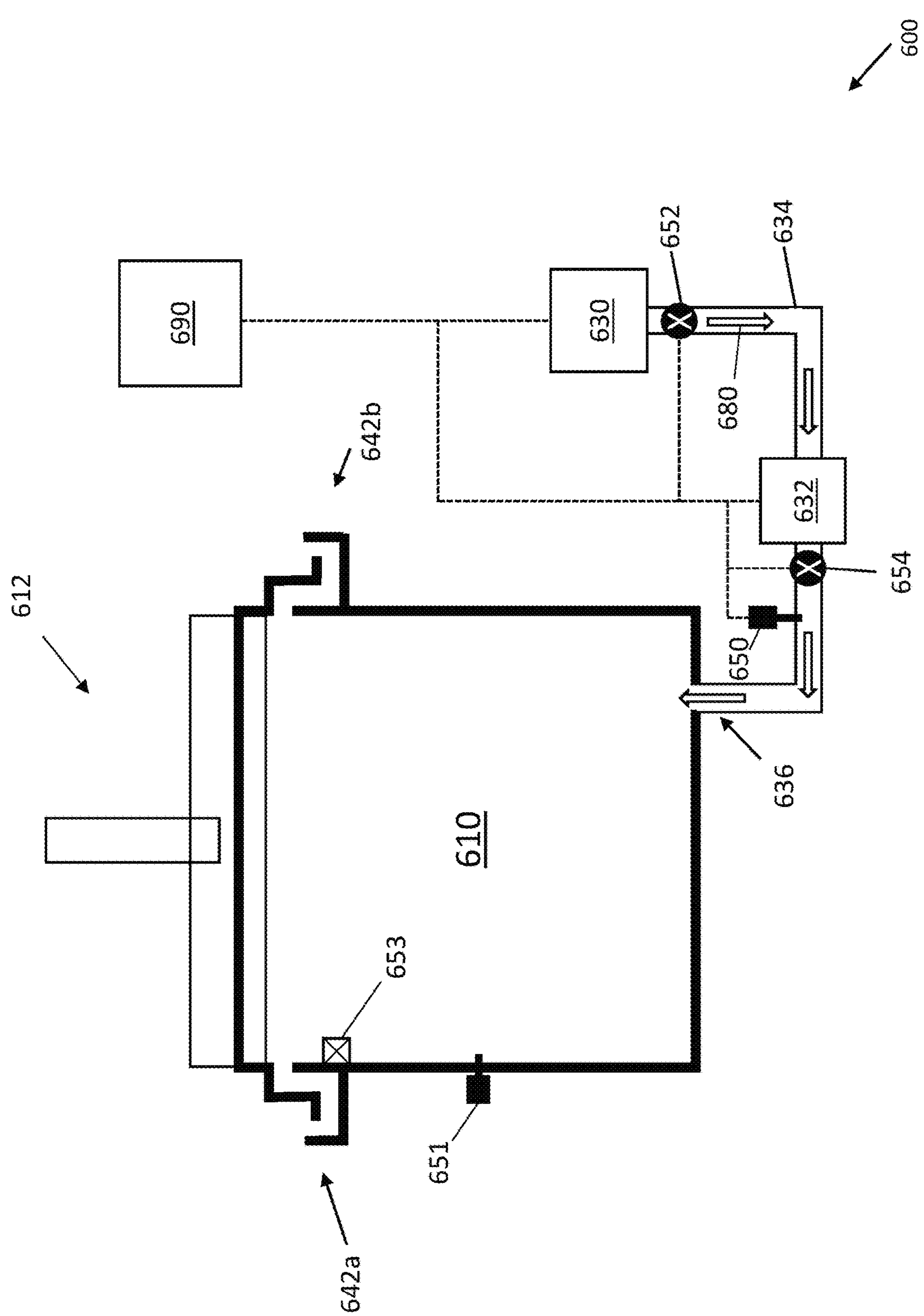
FIG. 6 is a schematic for a machine tool contaminant control system.

FIG. 6 shows an embodiment of a contaminant control system 600 integrated with a machine tool enclosure 610. Cutting, grinding, and/or milling machine tool components 612 are coupled to the machine tool enclosure 610. Any number of internal components of a machine tool may be disposed in the machine tool enclosure 610, with any components that produce swarf or chips (i.e., cutting, grinding, and/or milling components 612) outside of the enclosure. The contaminant control system reduces or substantially prevents contaminants such as swarf from entering the machine tool enclosure 610. The contaminant control system includes a gas source 630, a duct 634 coupling the gas source to the machine tool enclosure, a pressure sensor 651, and a controller 690. The contaminant control system may additionally include a temperature conditioner 632, valves 652 and 654, and pressure sensor 650. Any valves or temperature sensors present in the contaminant control system are coupled to the controller. The controller controls the flow of gas 680 from the gas source 630 and into the machine tool enclosure 610 via an inlet 636. The machine tool includes at least one outlet for the gas to exit the machine tool. The gas outlets are positioned at the locations where the cutting, grinding, and/or milling components component 612 couple to enclosure 610. The gas outlets have a labyrinthine geometry to create a tortuous gas transport path. In some embodiments, the outlet is circumferential. In other embodiments, the machine tool includes at least two outlets 642*a* and 642*b*.

Figure 7A:
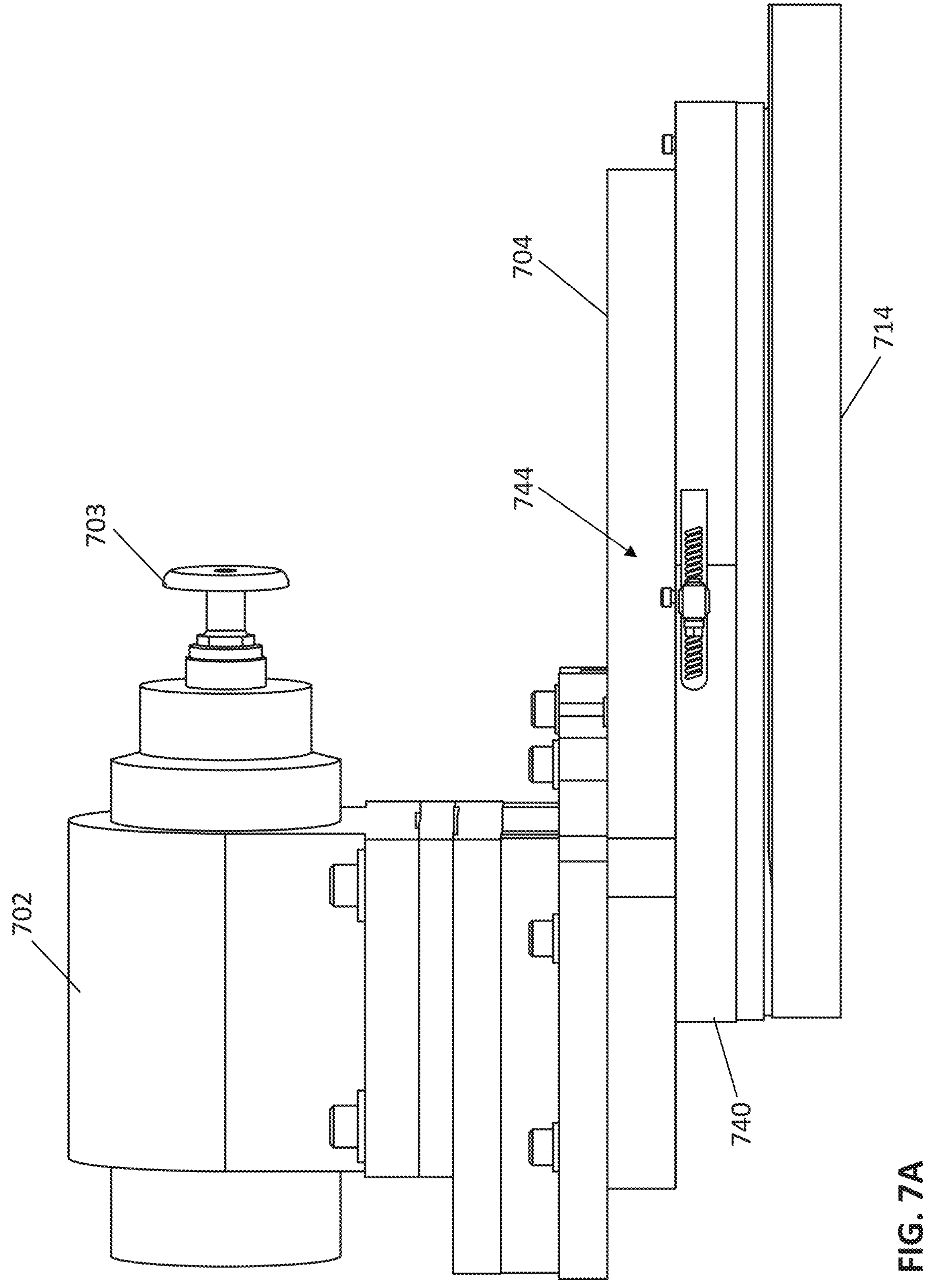
FIG. 7A shows part of an eccentric position system with an example of a labyrinthine channel creating a tortuous gas transport path.
Figure 7B:
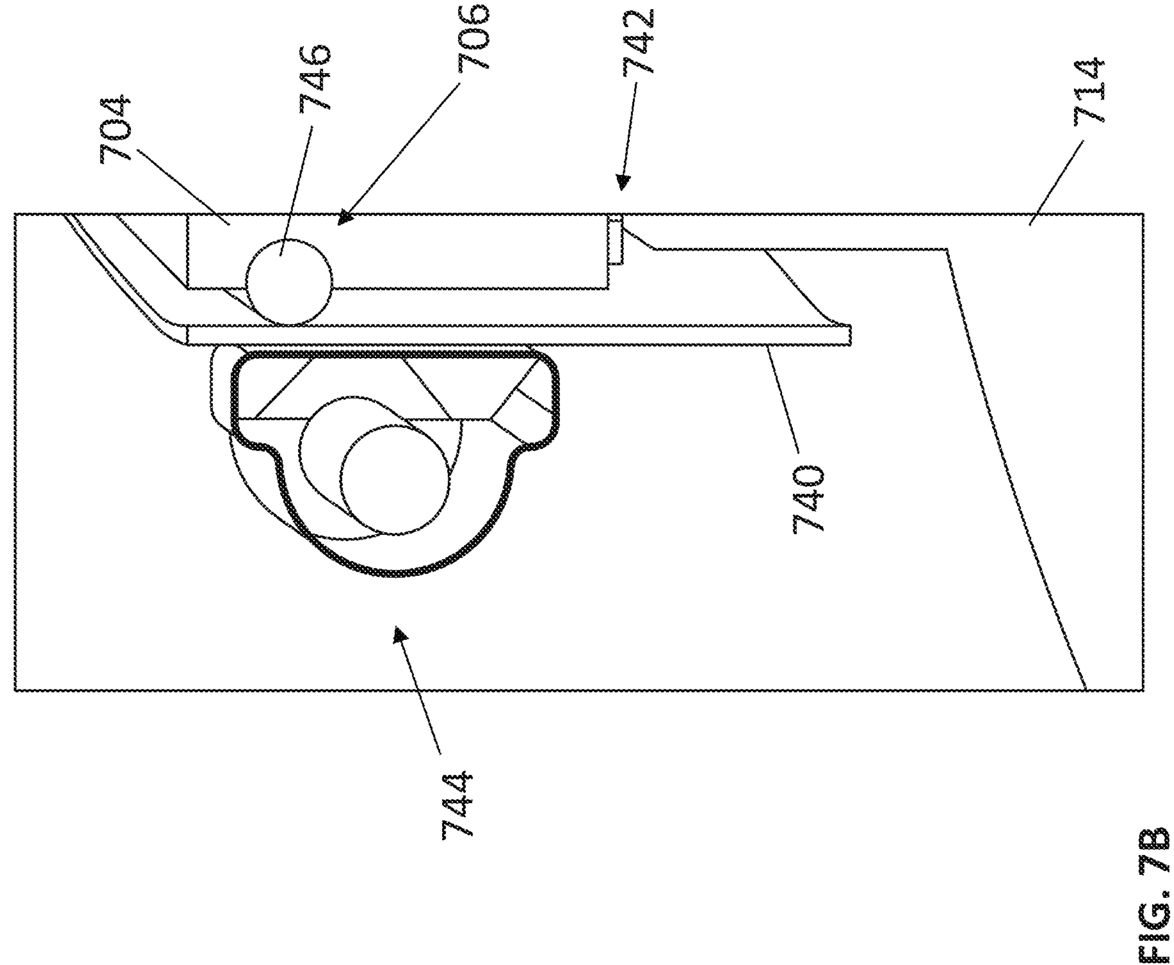
FIG. 7B is a cross-sectional view of the labyrinthine channel in the eccentric position system in FIG. 7A.

FIG. 7A shows part of an eccentric position system with an example of a labyrinthine structure at the gap between the base 714 and the movable platform 704 near the location of the bearings. The movable platform 704 supports an object to be positioned, e.g., a cutting or grinding tool 702, mounted to an exterior surface of the platform 704, with a working end 703 that the system positions with respect to a workpiece (e.g., a bearing race). In this example, the labyrinthine structure is formed in part by a shield or metal band 740 disposed over the gap 742 between the base 714 and the platform 704. The metal band 740 is held in place with a hose clamp spot welded to a side of the metal band and tightened down onto the outer edge of the platform 704 near the gap 742. The outer edge of the platform 704 includes a circumferential groove 706 near the gap 742. In one embodiment, an O-ring 746 is disposed in the groove 706 between the metal band 740 and the platform 704. In another embodiment, a bead of sealant (e.g., polyurethane sealant, or silicone sealant) is disposed in the groove 706 between the metal band 740 and the platform 704.

The metal band 740 creates a labyrinthine geometry to create a tortuous gas transport path. The metal band 740 is made of a metal that resists corrosion, plastic deformation, and denting (e.g., stainless steel or titanium). In addition to creating a tortuous gas transport path, the labyrinthine geometry also provides a barrier to prevent or reduce liquids (e.g., coolant, oil, or water) splashing into the cavity of the positioning system through the gap 742. The metal band 740 has a thickness of about 0.25 mm to about 5 mm (e.g., 0.25 mm, 0.4 mm, 0.5 mm, 1.0 mm, 3 mm, or 5 mm). The width of the metal band 740 may be about 10 times to about 1000 times bigger than the width of the gap 742 (e.g., 10, 50, 100, 500, 1000 times bigger).

In some embodiments a more tortuous gas transport path is desirable. A more tortuous gas transport path may be created by disposing a wavy or corrugated band of metal over the gap 742, where the gas flows across the surface of the wavy metal to exit the positioning system. The wavy metal band may create U-shaped or W-shaped bends in the gas transport path. A more tortuous gas transport path may also be created by layering several metal bands to create several U-shaped bends in the gas transport path.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A contaminant control system comprising:
- a source supplying a gas flow;
- a channel fluidly coupled to the source to direct the gas flow;
- a pressure sensor disposed within the channel;
- a machine tool comprising:
  - an enclosure comprising:
    - moving components disposed within the enclosure;
    - an inlet fluidly coupling the channel and the enclosure; and
    - at least one outlet to direct the gas flow out of the enclosure; and
  - a cutting tool disposed outside of the enclosure and operably coupled to the moving components;
- a controller operably coupled to the source and the pressure sensor;
- a temperature probe operably coupled to the controller, thermally coupled to the moving components, and configured to measure a temperature of the moving components; and
- a temperature conditioner fluidly coupled to the channel and operably coupled to the controller, the temperature conditioner configured to condition a temperature of the gas flow based on the temperature of the moving components,
- wherein the temperature conditioner is configured to heat the gas flow,
- wherein the gas flow prevents at least some contaminants generated by the cutting tool from entering the enclosure.

2. The contaminant control system of claim 1, wherein the moving components comprise precision positioning components.

3. The contaminant control system of claim 2, wherein the precision positioning components comprise:
- a first assembly comprising a first rotatable portion that is rotatable about a first axis; and
- a second assembly comprising a second rotatable portion that is rotatable about a second axis that is not coincident with the first axis,
- wherein the first and second assemblies are coupled such that rotation of the first rotatable portion causes eccentric rotation of the second rotatable portion about the first axis.

4. The contaminant control system of claim 2, wherein the temperature probe is in direct contact with a surface of the precision positioning components.

5. The contaminant control system of claim 1, wherein the at least some contaminants consist of at least one of machining chips or grinding swarf.

6. The contaminant control system of claim 1, wherein the gas flow creates a pressure within the enclosure about 0.5 inches of water to about 100 inches of water above an ambient pressure.

7. The contaminant control system of claim 1, wherein:
- the source comprises a source of pressurized gas; and
- the contaminant control system further comprises:
- a pressure regulator disposed between the source and the channel; and
- a first valve disposed between the source and the inlet and operably coupled to the controller.

8. The contaminant control system of claim 1, wherein the temperature conditioner is configured to heat the gas flow until a temperature at the at least one outlet reaches an upper set point.

9. The contaminant control system of claim 8, wherein the temperature conditioner is further configured to be pulsed so that the temperature of the moving components stays within a temperature band.

10. The contaminant control system of claim 1, wherein the temperature probe is a first temperature probe and further comprising:

a second temperature probe configured to measure an ambient temperature; and a third temperature probe configured to measure a temperature of a coolant supplied to the machine tool.

11. A method of controlling contaminants in a machine tool, the machine tool comprising:

an enclosure comprising:

moving components disposed within the enclosure;

an inlet fluidly coupling the enclosure to a source supplying a gas flow to direct the gas flow into the enclosure;

a pressure sensor disposed within the enclosure; and at least one outlet to direct the gas flow out of the enclosure; and a cutting tool disposed outside of the enclosure and operably coupled to the moving components;

the method of controlling contaminants comprising:

regulating the gas flow through the machine tool using a controller, the controller operably coupled to the pressure sensor and the source supplying the gas flow;

measuring a temperature of the moving components; and conditioning a temperature of the gas flow based on the temperature of the moving components, wherein conditioning the temperature of the gas flow comprises heating the gas flow, wherein the gas flow prevents at least some contaminants generated by the cutting tool from entering the enclosure.

12. The method of claim 11, wherein the moving components comprise precision positioning components.

13. The method of claim 12, wherein the precision positioning components comprise:

a first assembly comprising a first rotatable portion that is rotatable about a first axis; and a second assembly comprising a second rotatable portion that is rotatable about a second axis that is not coincident with the first axis, wherein the first and second assemblies are coupled such that rotation of the first rotatable portion causes eccentric rotation of the second rotatable portion about the first axis.

14. The method of claim 11, wherein the at least some contaminants consist of at least one of machining chips or grinding swarf.

15. The method of claim 11, wherein controlling the gas flow comprises creating a pressure within the enclosure of about 0.5 inches of water to about 100 inches of water above an ambient pressure.

16. The method of claim 11, wherein heating the gas flow comprises:

heating the gas flow until a temperature at the at least one outlet reaches an upper set point.

17. The method of claim 16, wherein heating the gas flow further comprises:

pulsing heating of the gas flow so that the temperature of the moving components stays within a temperature band.

18. The method of claim 11, further comprising:

measuring an ambient temperature; and measuring a temperature of a coolant supplied to the machine tool.

* * * * *